May 16, 1961

M. KORFF ET AL 2,984,788

SWEEP CIRCUIT

Filed Nov. 12, 1959

INVENTORS
MARVIN KORFF &
HOWARD M. SCOTT
BY J. L. Whittaker
ATTORNEY 2,984,788

SWEEP CIRCUIT

Marvin Korff, Haddonfield, N.J., and Howard M. Scott, Philadelphia, Pa., assignors to Radio Corporation of America, a corporation of Delaware Filed Nov. 12, 1959, Ser. No. 852,330

11 Claims. (Cl. 328—35)

Figures 1, 2:
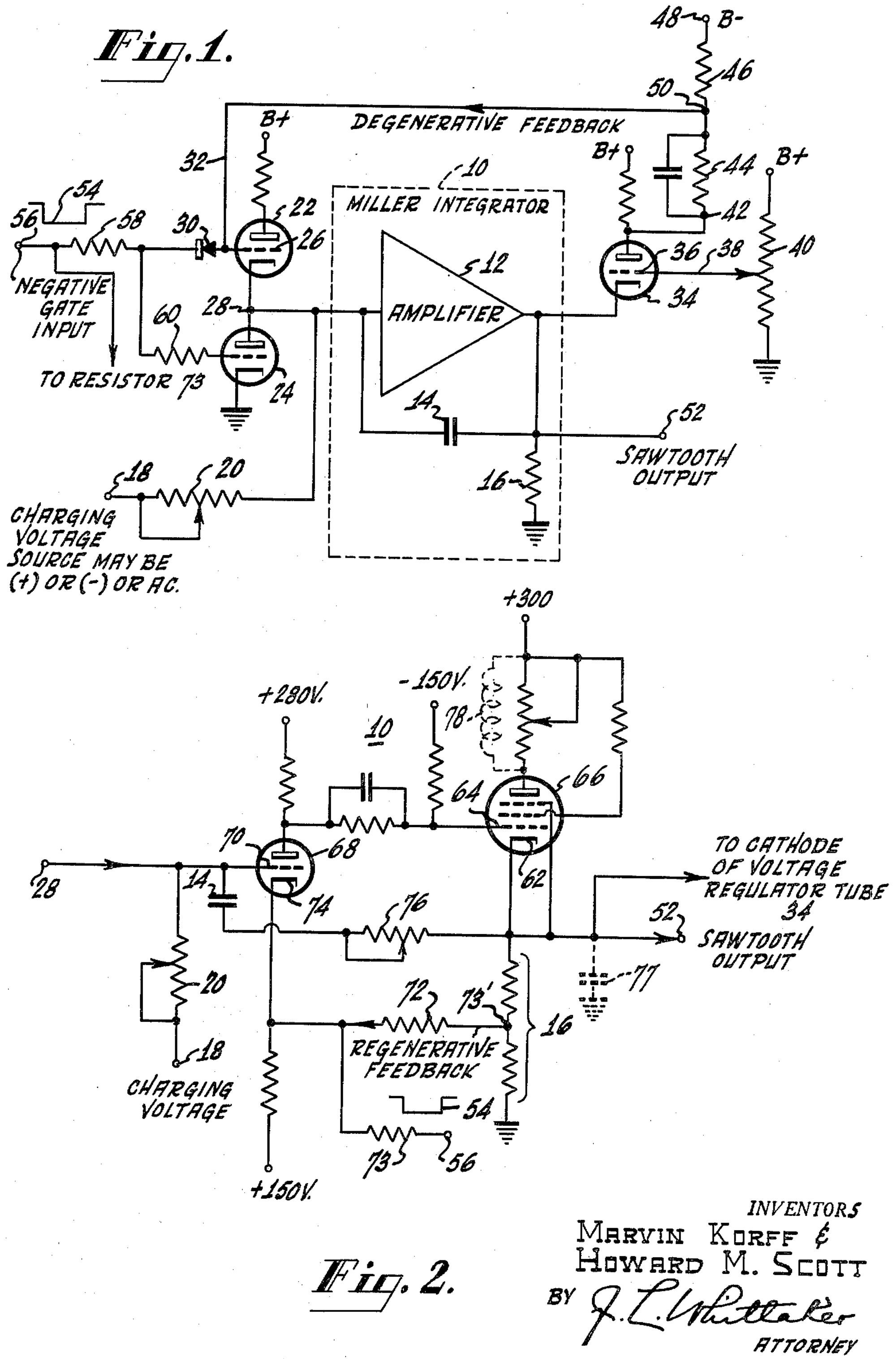

The present invention relates to improved linear sweep circuits such as the Miller integrator sweep circuit.

Many conventional sweep circuits are not suitable for high precision radar and other timing applications. They suffer from one or more of the following disadvantages: poor sweep linearity; change in sweep slope with change in duty cycle; change in base line with changes in various circuit parameters such as line voltage, tube aging, etc.; and inability to produce sweeps of opposite polarity.

The principal object of this invention is to provide an improved sweep generator which substantially overcomes these disadvantages.

An important feature of the invention resides in the capability of the circuit to provide sawtooth sweep signals of either polarity determined solely by the polarity of an applied potential or signal.

The sweep circuit of the instant invention preferably utilizes a Miller integrator. A preferred embodiment of the invention includes an amplifier having an input circuit and an output circuit and a charging capacitor connected from the output circuit to the input circuit. The amplifier, for example, may be a pentode, the input circuit the control grid circuit of the pentode, and the output circuit either the anode or cathode circuit of the pentode, depending upon load circuit requirements. D.C. coupling is used throughout to prevent changes in sweep slope or base line with duty cycle variation. Base line clamping is provided by a pair of normally-conducting, series-connected amplifiers. One of these is connected to a point of reference voltage, such as ground, so as to clamp the junction of the two amplifiers, when they conduct, to a predetermined voltage level. The input circuit to the Miller integrator is connected to this junction. A gate pulse applied to the amplifiers cuts them off, whereby the junction between them floats and can be driven positive or negative by a charging voltage applied to the junction. Base line drift at the output of the Miller integrator is sensed by comparing the base line voltage with a reference voltage. This drift may be due to line voltage variation or other changing circuit parameters. A degenerative feedback loop adjusts the current conducted by the series-connected amplifiers in response to such drift. This changes the voltage at the junction of the two amplifiers in a sense and amount to maintain the base line voltage constant.

The invention will be described in greater detail by reference to the following description taken in connection with the accompanying drawings in which similar reference characters are applied to similar elements, and in which:

Fig. 1 is a block and schematic circuit diagram of a preferred form of the present invention; and Fig. 2 is a schematic circuit diagram of a typical Miller integrator portion of the invention.

The Miller integrator 10 shown in Fig. 1 is illustrated in a general way. It includes an amplifier 12 and a capacitor 14 extending from the output circuit to the input circuit of the amplifier. The sawtooth sweep output of the integrator is taken from across a load resistor 16. Various types of Miller integrators and sweep circuits employing them, as well as similar boot-strap and other linear sweep generators are described in the Radiation Laboratory Series, volume 19, at pp. 31–37 and 278–285 (McGraw-Hill, 1949).

The sweep circuit of the present invention is one which can produce either a positive-going or a negative-going sawtooth voltage. The charging circuit for capacitor 14 is one to which a positive or a negative charging voltage with respect to ground may be applied. The charging circuit includes an input terminal 18 and an adjustable resistor 20. The latter controls the slope of the sawtooth sweep.

Series-connected triodes 22 and 24 normally conduct. The amount of current they conduct depends upon the grid bias applied to the control grid 26 of the upper triode 22. The way in which this bias is obtained will be explained in greater detail later. As the cathode of the lower triode 24 is, for example, connected directly to ground, the quiescent voltage at point 28, the junction of the two triodes, when they are conducting, is normally close to ground potential. Any change in the bias on control grid 26 of the upper triode 22 changes the amount of current conducted in the series circuit of triodes 22 and 24 and this, in turn, changes the quiescent voltage level at the junction point 28.

During the interval between sawtooth sweeps, amplifier 12 conducts and there is a certain quiescent voltage across load resistor 16. The Miller integrator load resistor 16 serves, in addition, as the cathode resistor for a bias voltage regulator tube 34. The control grid 36 of regulator tube 34 is biased at a selected reference potential derived from a tap 38 on a voltage divider 40. Since the cathode voltage and grid voltage of the regulator triode 34 are fixed, its anode voltage is also normally fixed. This anode voltage, that is, the voltage appearing at lead 42, is applied to one end of a second voltage divider consisting of series-connected resistors 44 and 46. A negative voltage is applied to the other end 48 of the voltage divider. The values of resistors 44 and 46 and of the voltages at points 42 and 48 determine the voltage present at the intermediate point 50. This voltage is the quiescent grid bias voltage for triode 22 and, in practice, is close to the quiescent value of voltage at point 52.

In operation, the series-connected upper and lower triodes 22 and 24 normally conduct. The amount of current they conduct is determined by the bias on the control grid 26 of the upper triode 22. Thus, the junction point 28 is held at some reference potential—close to ground potential in this specific application although any other value may be used instead. The voltage at the junction point 28 determines the quiescent current conducted by amplifier 12 and this, in turn, determines the quiescent voltage at output terminal 52. In brief, the two conducting triodes 22 and 24 clamp output terminal 52 to a selected quiescent voltage level.

If, for any reason, the quiescent voltage level at point 52 should attempt to change, it will cause the regulator triode 34 to conduct more or less current. The regulator triode 34 is in the degenerative feedback loop extending from the output of the Miller integrator to its input through clamping triodes 24, 26. Any such change in voltage causes the current drawn by the Miller integrator amplifier 12 to change and to change in a sense to maintain the quiescent voltage at terminal 52 constant.

The sawtooth sweep is produced by applying a negative gate pulse 54 to input terminal 56. The negative gate passes through coupling resistor 58 and diode 30 to the control grid 26 of the upper triode 22, and also through coupling resistors 58 and 60 to the control grid of the lower triode 24. The function of diode 30 is to effectively isolate the degenerative feedback circuit which includes line 32 from the negative gate input circuit to the triodes. The negative gate voltage is sufficient to overpower any feedback via line 32 so that the negative feedback circuit is effectively disconnected.

When the upper and lower triodes 22 and 24 are cut off, their junction point 28 is effectively disconnected from its reference voltage level. The charging voltage applied to the terminal 18 therefore can begin to charge capacitor 14. The Miller integrator is operated class A so that its output can be positive or negative. Thus, the charging voltage at the terminal 18 may be either positive or negative. The output sawtooth wave appears at terminal 52.

A typical Miller integrator useful in said preferred embodiment of the present invention is shown in more detail in Fig. 2. It is a cathode-follower type of Miller integrator with a charging capacitor 14 effectively coupled between the cathode 62 and the control grid 64 of a pentode 66. Physically, the capacitor 14 is connected between the cathode 62 of the pentode 66 and the control grid 70 of a feedback triode 68 in the feedback loop. The anode of the feedback triode 68, in turn, is connected to the control grid 64 of the pentode 66, completing the loop.

The linearity of the sawtooth sweep generated by the Miller integrator circuit depends upon the gain of the integrator. This gain is increased in the present instance by regenerative feedback. The regeneration circuit consists of a resistor 72 of small value extending from an intermediate point 73 on the load resistor 16 in the cathode circuit of the pentode 66 to the cathode 74 of the triode.

The Miller integrator operates in brief as follows. The negative gate pulse 54 blocks the upper and lower triodes 22, 24 and effectively decouples the junction input terminal 28 from ground and the charging voltage applied to terminal 18 begins to charge capacitor 14. If desired, the negative gate pulse 54 may also be applied to terminal 56 and through a resistor 73 to the cathode 74 of the feedback triode 68. The charging voltage on capacitor 14 causes a change in the amount of current conducted by feedback triode 68 which changes the anode voltage of triode 68. The anode of triode 68 is coupled to the control grid 64 of the pentode 66. The resulting change in current flow through the pentode causes a change in the voltage on the cathode 62 of the pentode which is fed back to the other terminal of the charging capacitor in usual Miller integrator fashion.

An adjustable resistor 76 in series with the charging capacitor 14 adds an adjustable step voltage to the sawtooth at the start of the sweep to compensate for deflection yoke capacitance indicated by the dash-line capacitor 77. The use of a relatively low value of capacitance 14 and low impedances at the grid of the feedback triode 68 and the cathode of pentode 66 makes the effect of this peaking resistor negligible during the discharge of capacitor 14.

In the embodiment of the invention illustrated, the sawtooth sweep output is taken from the cathode of the pentode 66. If desired, the sawtooth may be obtained from the anode instead, as shown by the dash-line yoke 78. Moreover, if push-pull operation is desired, outputs can be taken from both the cathode and anode using an additional amplifier for the cathode output.

The power supplies for the B+ and B— voltages may be conventional regulated power supplies. It can be shown that small changes in power supply voltage have very little effect on the quiescent output voltage. For example, the change in voltage at point 52 due to a change ΔE in the B+ can be shown to be $$\frac{\Delta E}{G_T}$$

where $G_T$ is the open loop gain of the regulator and amplifier.

While not limited thereto, the circuit of the invention has been found to especially be useful for P.P.I. radar type displays. In this case, the charging voltage is a sine wave at a frequency much lower than that of the sawtooth sweeps. The resulting sawtooth output is a sine-wave modulated sawtooth wave train.

What is claimed is:

1. A sweep circuit including a linear sweep generator having a charging capacitor; means for normally clamping said charging capacitor to a reference voltage level; a source of charging voltage of any desired polarity for charging said capacitor; and means for effectively simultaneously disconnecting said reference voltage from said capacitor and connecting said charging source to said capacitor.

2. Apparatus as defined in claim 1 wherein said linear sweep generator is a Miller integrator circuit.

3. A sawtooth generator comprising, in combination, a linear sweep generator having an input terminal, an output terminal, and a charging capacitor connected between said input and said output terminals; means for normally maintaining said output terminal at a selected quiescent voltage, said means including a pair of normally-conducting discharge devices connected in series with the junction of said two devices connected to said input terminal; and means responsive to any change in said quiescent voltage for applying a bias voltage to at least one of said devices in a sense to maintain said voltage at said output terminal substantially constant.

4. Apparatus as defined in claim 3 wherein said linear sweep generator is a Miller integrator circuit.

5. A circuit for clamping the base line of a sweep produced by a linear sweep generator such as a Miller integrator to a predetermined voltage level comprising, in combination, connections for a source of reference voltage; means for comparing the quiescent voltage present on the output of said Miller integrator with said reference voltage for sensing any change in said quiescent voltage; and means responsive to such change for adjusting the quiescent current drawn by said Miller integrator in a sense to maintain said base line voltage constant.

6. A circuit for clamping the base line of a sweep produced by a cathode-follower, Miller integrator, sweep circuit to a predetermined voltage level comprising, in combination, connections for a source of reference voltage; means for comparing the quiescent voltage present on the output of said Miller integrator with said reference voltage for sensing any change in said quiescent voltage, said means including an amplifier having a common cathode load impedance with said Miller integrator and a control element to which said reference voltage is applied; and a degenerative feedback circuit including said amplifier for controlling the quiescent current drawn by said Miller integrator in a sense to maintain said quiescent voltage constant.

7. In the circuit as set forth in claim 6, said last-named means including means for controlling the bias on said Miller integrator.

8. In the circuit as set forth in claim 6, said Miller integrator including an input terminal, said combination further including connections for a source of operating voltage, a pair of normally-conducting amplifiers connected in series across said source of operating voltage, said input terminal being connected to the junction between said series-connected amplifiers; and said degenerative feedback circuit including means for applying a bias voltage to at least one of said series-connected amplifiers.

9. A sweep generator including a Miller integrator having an input terminal; a clamping circuit for said Miller integrator comprising a pair of normally-conducting series-connected amplifiers, the junction between said series-connected amplifiers providing a source of clamping voltage when said amplifiers conduct, means connecting said input terminal to said junction; a source of charging voltage connected to said terminal and means for applying a gate pulse to said amplifiers for cutting them off.

10. A clamping circuit for a Miller integrator comprising, in combination, a pair of normally-conducting triodes connected in series between a source of operating voltage and a source of reference voltage, the input terminal of said Miller integrator being connected to the junction between said series-connected triodes; a source of charging voltage for said Miller integrator connected to said junction; and means for applying a negative gate to the control grids of said triodes.

11. A clamping circuit as set forth in claim 10, further including a degenerative feedback loop extending from the output terminal of said Miller integrator to the control grid of at least one of said triodes.

References Cited in the file of this patent

UNITED STATES PATENTS

| | | |
|---|---|---|
| 2,562,295 | Chance | July 31, 1951 |
| 2,627,025 | Trembly | Jan. 27, 1953 |
| 2,642,532 | Mofenson | June 16, 1953 |
| 2,662,197 | Le Comte | Dec. 8, 1953 |
| 2,662,981 | Segerstrom | Dec. 15, 1953 |
| 2,897,453 | Mansford | July 28, 1959 |
| 2,905,819 | Kleinman | Sept. 22, 1959 |